(12) United States Patent
Chen et al.

(10) Patent No.: US 10,921,942 B2
(45) Date of Patent: Feb. 16, 2021

(54) TOUCH SYSTEM, ITS TOUCH DEVICE AND INPUT DEVICE, AND ITS SIGNAL TRANSMISSION METHOD

(71) Applicant: ELAN MICROELECTRONICS CORPORATION, Hsinchu (TW)

(72) Inventors: Han-Wei Chen, Taipei (TW); Hsuan-Wen Tseng, New Taipei (TW); Yi-Hsin Tao, Hsinchu (TW); Chia-Hsing Lin, Hsinchu (TW); Chen-Yu Hou, Tainan (TW); Chieh-Wen Chen, Tainan (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/656,558

(22) Filed: Oct. 17, 2019

(65) Prior Publication Data

US 2020/0133436 A1    Apr. 30, 2020

Related U.S. Application Data

(60) Provisional application No. 62/750,192, filed on Oct. 24, 2018, provisional application No. 62/863,878, filed on Jun. 20, 2019.

(30) Foreign Application Priority Data

Aug. 14, 2019 (TW) ................. 108129026

(51) Int. Cl.
*G06F 3/044* (2006.01)
*G06F 3/041* (2006.01)
*G06F 3/0354* (2013.01)

(52) U.S. Cl.
CPC ........ *G06F 3/0443* (2019.05); *G06F 3/04162* (2019.05); *G06F 3/04166* (2019.05); *G06F 3/03545* (2013.01)

(58) Field of Classification Search
CPC .. G06F 3/03545; G06F 3/041; G06F 3/04166; G06F 3/04162; G06F 3/0443
See application file for complete search history.

(56) References Cited

U.S. PATENT DOCUMENTS

2012/0182254 A1    7/2012 Jang et al.
2017/0331653 A1*  11/2017 Higashinaka .......... H04L 27/14
2018/0188836 A1*   7/2018 Park .................... G06F 3/03545

FOREIGN PATENT DOCUMENTS

TW       201229864 A    7/2012
TW          I412967 B   10/2013
TW          I526917 B    3/2016
(Continued)

*Primary Examiner* — Charles V Hicks
(74) *Attorney, Agent, or Firm* — PatentTM.US

(57) ABSTRACT

A touch system has a touch device and an input device. The touch system executes a first mode and a second mode at different times. In the first mode, the touch device transmits a modulation signal to drive the touch electrodes and to be used as an uplink signal. The input device receives the modulation signal. In the second mode, the touch device receives the downlink signal from the input device. Thus, the touch device does not have to transmit the driving signal and the uplink signal at different times. Then the time is saved for the rest work periods so that every work periods get longer length of time.

20 Claims, 13 Drawing Sheets

(56) References Cited

FOREIGN PATENT DOCUMENTS

| | | | |
|---|---|---|---|
| TW | 201640301 | A | 11/2016 |
| TW | I629634 | B | 7/2018 |
| TW | 201832057 | A | 9/2018 |

\* cited by examiner

TOUCH SYSTEM, ITS TOUCH DEVICE AND INPUT DEVICE, AND ITS SIGNAL TRANSMISSION METHOD

CROSS-REFERENCE TO RELATED APPLICATIONS

This application claims the benefit of United States provisional application filed on Oct. 24, 2018 and having application Ser. No. 62/750,192, the entire contents of which are hereby incorporated herein by reference.

This application claims the benefit of United States provisional application filed on Jun. 20, 2019 and having application Ser. No. 62/863,878, the entire contents of which are hereby incorporated herein by reference.

This application is based upon and claims priority under 35 U.S.C. 119 from Taiwan Patent Application No. 108129026 filed on Aug. 14, 2019, which is hereby specifically incorporated herein by this reference thereto.

BACKGROUND OF THE INVENTION

1. Field of the Invention

The present invention relates to a touch system, especially to a touch system with two-way communication touch device and input device.

2. Description of the Prior Arts

In the conventional touch system, the touch device and the input device cooperate to allow the user to manipulate the touch device through the finger or the input device. In the prior art, the input device can send a message in one-way or receive and send a message in two-way.

Taking a two-way stylus with a touch device as an example, the touch device executes the detection of the finger and of the two-way stylus in a time division manner. When executing finger detection, the touch device sends a driving signal to the electrode units, and then samples the electrode units to perform capacitive sensing to capture the touch information of the finger. When executing the detection of the two-way stylus, the touch device first transmits an uplink signal through the electrode units, and then detects a downlink signal of the two-way stylus with the electrode units. When the two-way stylus receives the uplink signal, the two-way stylus returns the downlink signal to synchronize with the touch device. Therefore, for the electrode units, they must divide a frame into different working periods to respectively detect the finger and the two-way stylus. Since the time of a frame is fixed, the more working periods are divided and the shorter the time that can be allocated for each working period. This results in insufficient detection time, which in turn affects the user experience.

SUMMARY OF THE INVENTION

In view of the aforementioned shortcomings, the present invention is directed to improve the signal transmission method of the prior art in order to improve the user experience.

To achieve the aforementioned advantages, the present invention provides a signal transmission method for a touch system, wherein the touch system comprises an input device and a touch device having a touch operation area, multiple first electrode units, multiple second electrode units and a control unit, and the method comprises steps of:

executing a first mode and a second mode in a time division manner by the touch device:

in the first mode, providing a modulation signal to at least one of the first electrode units for being used as a driving signal and an uplink signal transmitted to the input device; and in the second mode, receiving a downlink signal from the input device through the first and second electrode units.

In another aspect, the present invention provides a touch system comprising:

a touch device having
a touch operation area;
multiple first electrode units arranged under the touch operation area;
multiple second electrode units arranged under the touch operation area along different direction to the first electrode units; and
a control unit electrically connecting to the first and second electrode units; and
an input device having
a controller; and
an electrode assembly electrically connecting to the controller;
wherein the touch device executes a first mode and a second mode in a time division manner;
wherein in the first mode, providing a modulation signal to at least one of the first electrode units for being used as a driving signal and an uplink signal transmitted to the input device; and
wherein in the second mode, the first and second electrode units receive a downlink signal from the input device.

In another aspect, the present invention provides a signal transmission method for a touch device, wherein the touch device comprises a touch operation area, multiple first electrode units, multiple second electrode units and a control unit, and the method comprising a step of:

executing a first mode by providing a modulation signal to at least one of the first electrode units for being used as a driving signal and an uplink signal transmitted to an input device.

In another aspect, the present invention provides a touch device comprising:

a touch operation area;
multiple first electrode units arranged under the touch operation area;
multiple second electrode units arranged under the touch operation area along different direction to the first electrode units; and
a control unit electrically connecting to the first and second electrode units
wherein the touch device executes a first mode by providing a modulation signal to at least one of the first electrode units for being used as a driving signal and an uplink signal transmitted to an input device.

Therefore, by using the modulation signal as a characteristic of the driving signal and the uplink signal, the present invention does not need to transmit the driving signal and the uplink signal in a time-sharing manner. Thus, the time is freed up for the rest of the work periods, so that in different frames, each different work periods can be allocated more time to execute.

Other objectives, advantages and novel features of the invention will become more apparent from the following detailed description when taken in conjunction with the accompanying drawings.

DETAILED DESCRIPTION OF THE EMBODIMENTS

Figure 1A:
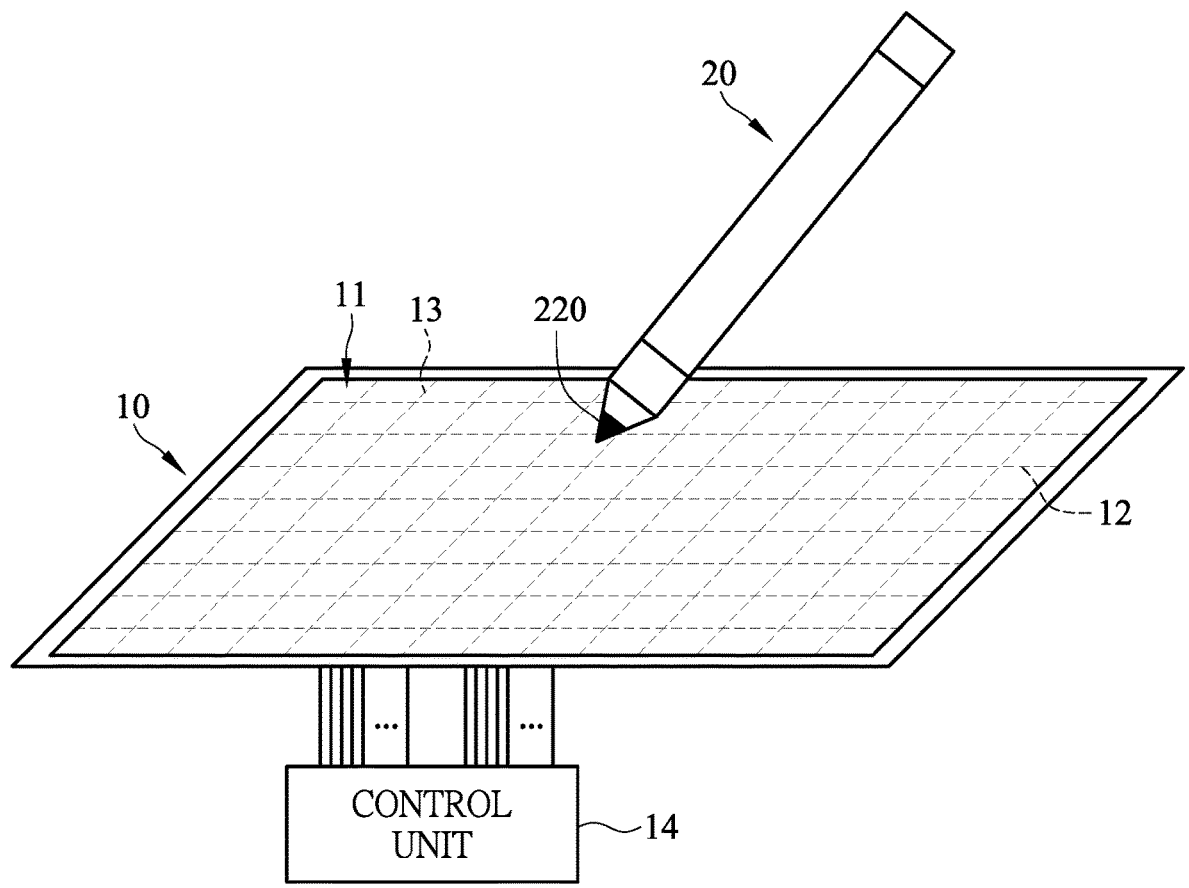
FIG. 1A is an illustrative view of a first embodiment of a touch system in accordance with the present invention.

With reference to FIG. 1A, a touch system in accordance with the present invention comprises a touch device 10 and an input device 20.

The touch device 10 comprises a touch operation area 11, multiple first electrode units 12, multiple second electrode units 13 and a control unit 14. The first electrode units 12 and the second electrode units 13 are arranged along different directions under the touch operation area 11. The control unit 14 respectively connects electrically to the first electrode units 12 and the second electrode units 13.

Figure 1B:
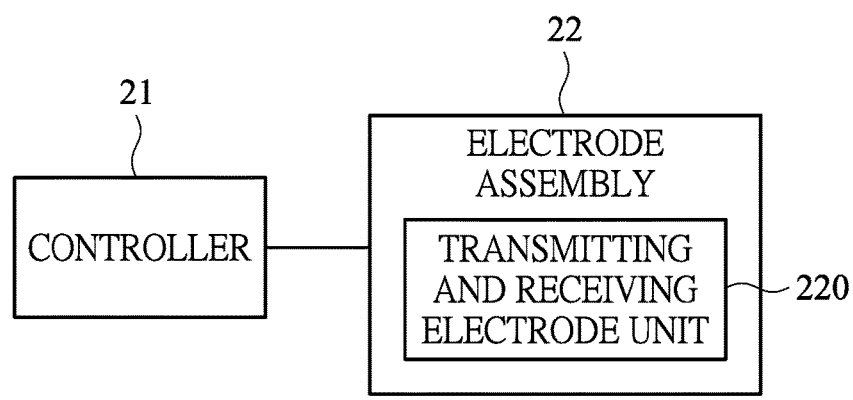
FIG. 1B is a block diagram of partial elements of an input device of the touch system in FIG. 1A.
Figure 2A:
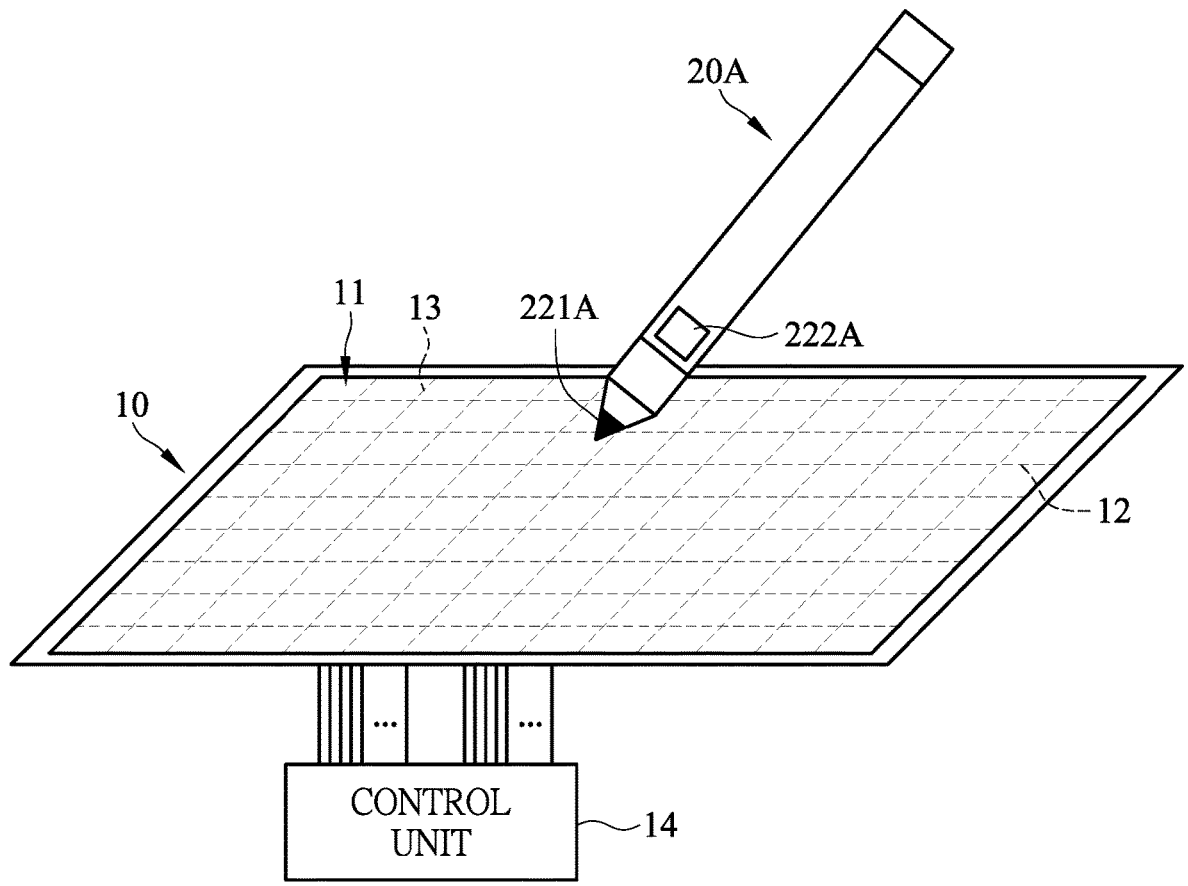
FIG. 2A is an illustrative view of a second embodiment of a touch system in accordance with the present invention.
Figure 2B:
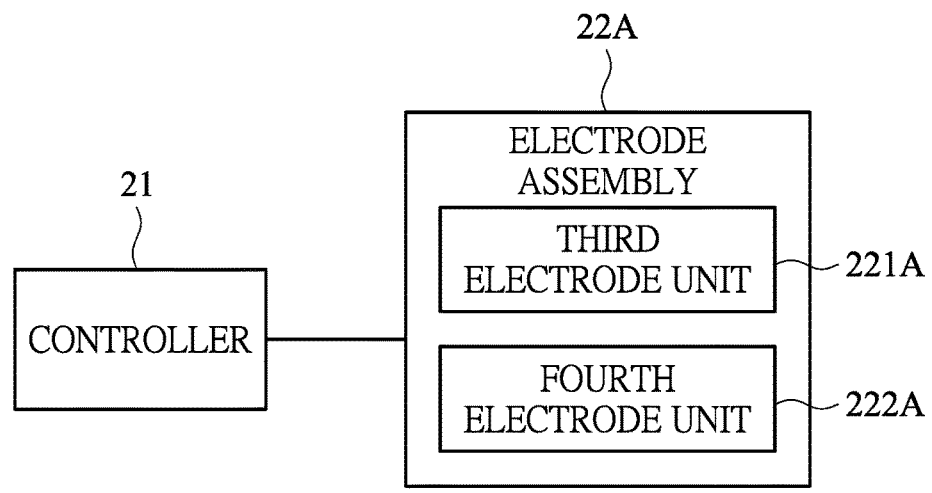
FIG. 2B is a block diagram of partial elements of an input device of the touch system in FIG. 2A.

With reference to FIGS. 1A and 1B, the input device 20 comprises a controller 21 and an electrode assembly 22. The electrode assembly 22 electrically connects to the controller 21. In this embodiment, the input device 20 is a stylus, but not limited thereto. In one embodiment as shown in FIGS. 1A and 1B, the electrode assembly 22 includes a transmitting and receiving electrode unit 220. The transmitting and receiving electrode unit 220 separately executes a sending operation of a downlink signal and a receiving of the modulation signal in a time division manner. In another embodiment as shown in FIGS. 2A and 2B, the electrode assembly 22A includes a third electrode unit 221A and a fourth electrode unit 222A. The input device 20A transmits the downlink signal through the third electrode unit 221A, and receives the modulation signal through the fourth electrode unit 222A.

The touch system executes two modes in a time division manner. In a first mode, the touch device 10 drives the first electrode units 12 by using the modulation signal as a driving signal. The modulation signal is also sent to the input device 20 through the first electrode units 12 as an uplink signal. A sensing signal is received by the second electrode units 13, and the change of the capacitance is used to sense whether a finger touches the touch operation area 11 and to know the position or other sensing information of the finger. The input device 20 receives the modulation signal from the touch device 10 by the electrode assembly 22. In a second mode, the touch device 10 receives the downlink signal from the input device 20 by the first electrode units 12 and the second electrode units 13, thereby obtaining the location or other auxiliary information of the input device 20.

Figure 3:
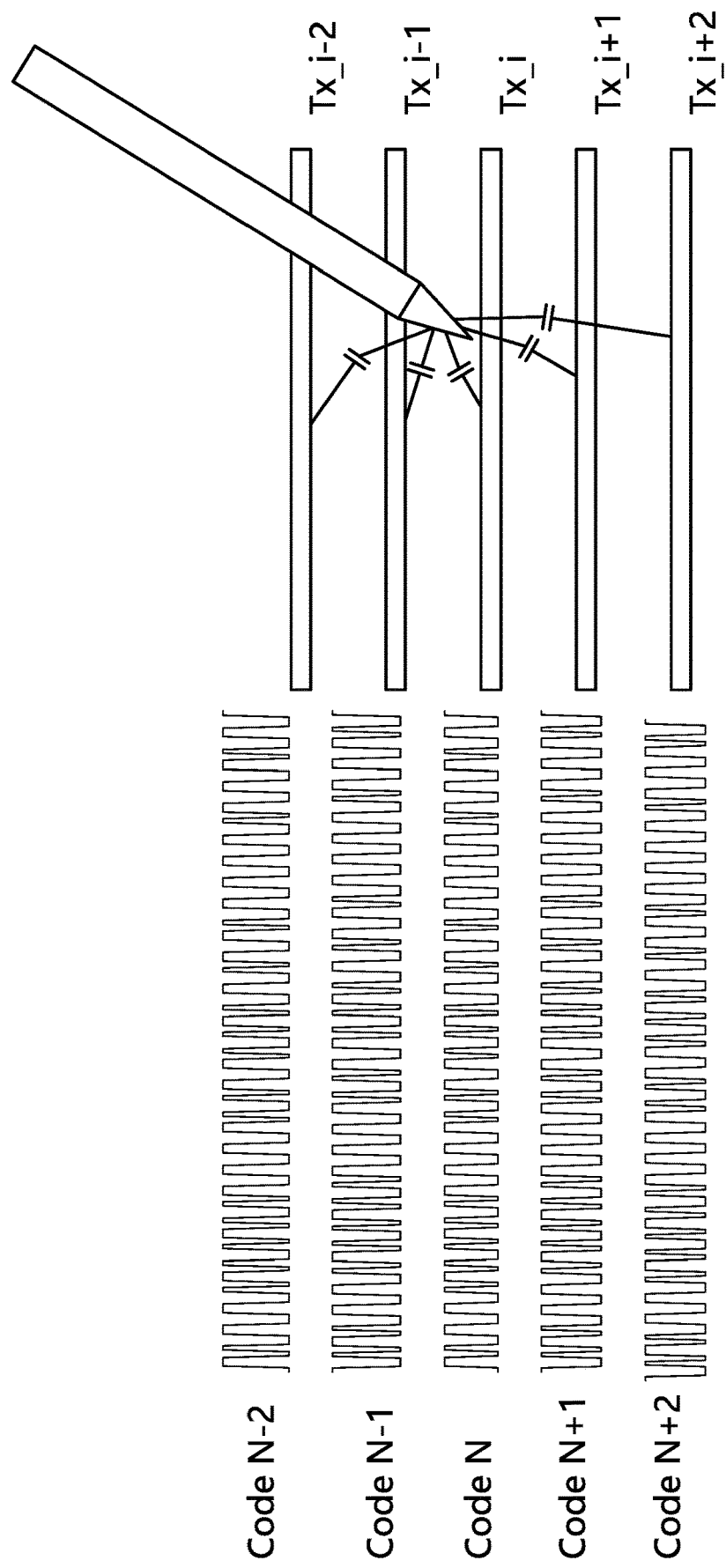
FIG. 3 is an illustrative operational view of the touch system in FIG. 1A, showing the codes of the modulation signals.

In one embodiment, all of the first electrode units 12 are driven by the same modulation signal. However, in another embodiment, in order to distinguish different modulation signals transmitted by the different first electrode units 12, the modulation signals transmitted by the first electrode units 12 respectively have different modulation characteristics but are orthogonal to each other. The different modulation characteristics described above are, for example, different spreading codes, etc., but are not limited thereto. With reference to FIG. 3, the spreading code of the modulation signal transmitted by the first electrode unit $T_{x\_i}$ of the $i^{th}$ row is $Code_N$, the spreading code of the modulation signal transmitted by the first electrode unit $T_{x\_i-1}$ of the i–1$^{th}$ row is $Code_{N-1}$, the spreading code of the modulation signal transmitted by the first electrode unit $T_{x\_i-2}$ on the i–2$^{th}$ line is $Code_{N-2}$, the spread code of the modulation signal transmitted by the first electrode unit $T_{x\_i+1}$ of the i+1$^{th}$ line is $Code_{N+1}$, and the spreading code of the modulation signal transmitted by the first electrode unit $T_{x\_i+2}$ of the i+2$^{th}$ row is $Code_{N+2}$. In one embodiment, the touch device 10 drives the first electrode units 12 of a specific number of rows with the modulation signals having different modulation characteristics instead of transmitting by all of the foregoing first electrode units 12. For example, the modulation signals having different modulation characteristics are transmitted by the odd or the even of the first electrode units 12 on the touch device 10; or the modulation signals having different modulation characteristics are transmitted by the first electrode units 12 at intervals of two or more, and the remaining first electrode units 12 may be inactive. In this case, the first electrode units 12 that transmit the modulation signals may also cover most of the touch operation area 11 so that the input device 20 receives the modulation signal as the uplink signal when approaching or contacting the touch device 10.

In addition, the different modulation characteristics may include, but are not limited to, on-off keying (OOK), Manchester coding, and Square.

The signal transmission method of the touch system in accordance with the present invention has the following various embodiments, but is not limited thereto.

Figure 4:
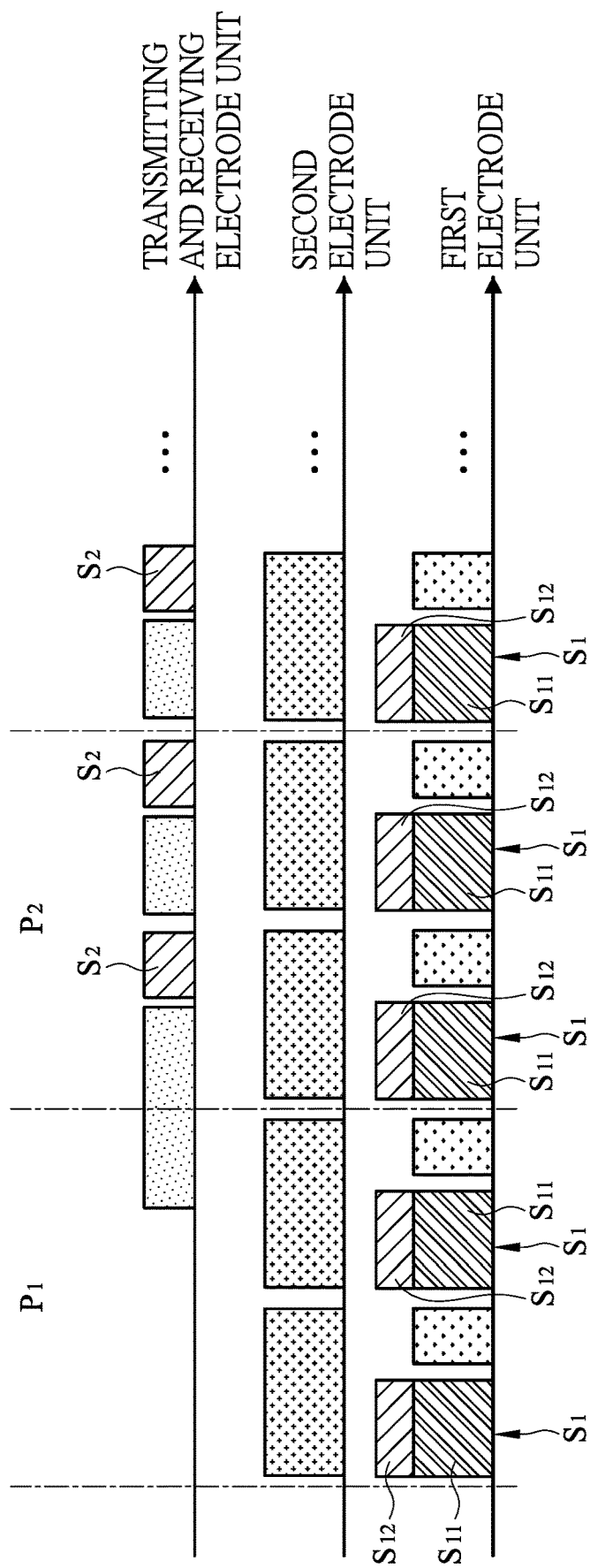
FIG. 4 is an illustrative operational view of a first embodiment of a signal transmission method in accordance with the present invention, showing frames for signal transmission.

With reference to FIGS. 4, 1A and 1B, the touch device 10 executes the first mode and the second mode in sequence in a frame. After receiving the modulation signal of the touch device 10, the input device 20 starts to send the downlink signal when the touch device 10 switches to the second mode. In the first mode, the touch device 10 drives the first electrode units 12 with the modulation signal $S_1$, and the modulation signal $S_1$ serves as the driving signal $S_{11}$ and the uplink signal $S_{12}$ simultaneously. The second electrode units 13 receive the sensing signal, and the transmitting and receiving electrode unit 210 of the input device 20 receives the modulation signal $S_1$. In the second mode, the first electrode units 12 and the second electrode units 13 of the touch device 10 are configured to receive the downlink signal $S_2$ sent by the transmitting and receiving electrode unit 210 of the input device 20. In this embodiment, the input device 20 does not approach or contact the touch operation area 11 of the touch device 10 during the first half of a frame $P_1$. When the end of the frame $P_1$ is reached, the input device 20 approaches or contacts the touch operation area 11 of the touch device 10. However, at this time, the transmitting and receiving electrode unit 210 of the input device 20 fails to receive the modulation signal $S_1$ again in time. Therefore, until the beginning of a frame $P_2$, the transmitting and receiving electrode unit 210 of the input device 20 completely receives the modulation signal S1 sent by the first electrode units 12 for the first time. The input device 20 then sends the downlink signal $S_2$ every time the touch device 10 enters the second mode until the input device 20 is away from the touch device 10 and the modulation signal $S_1$ is not received.

Figure 5:
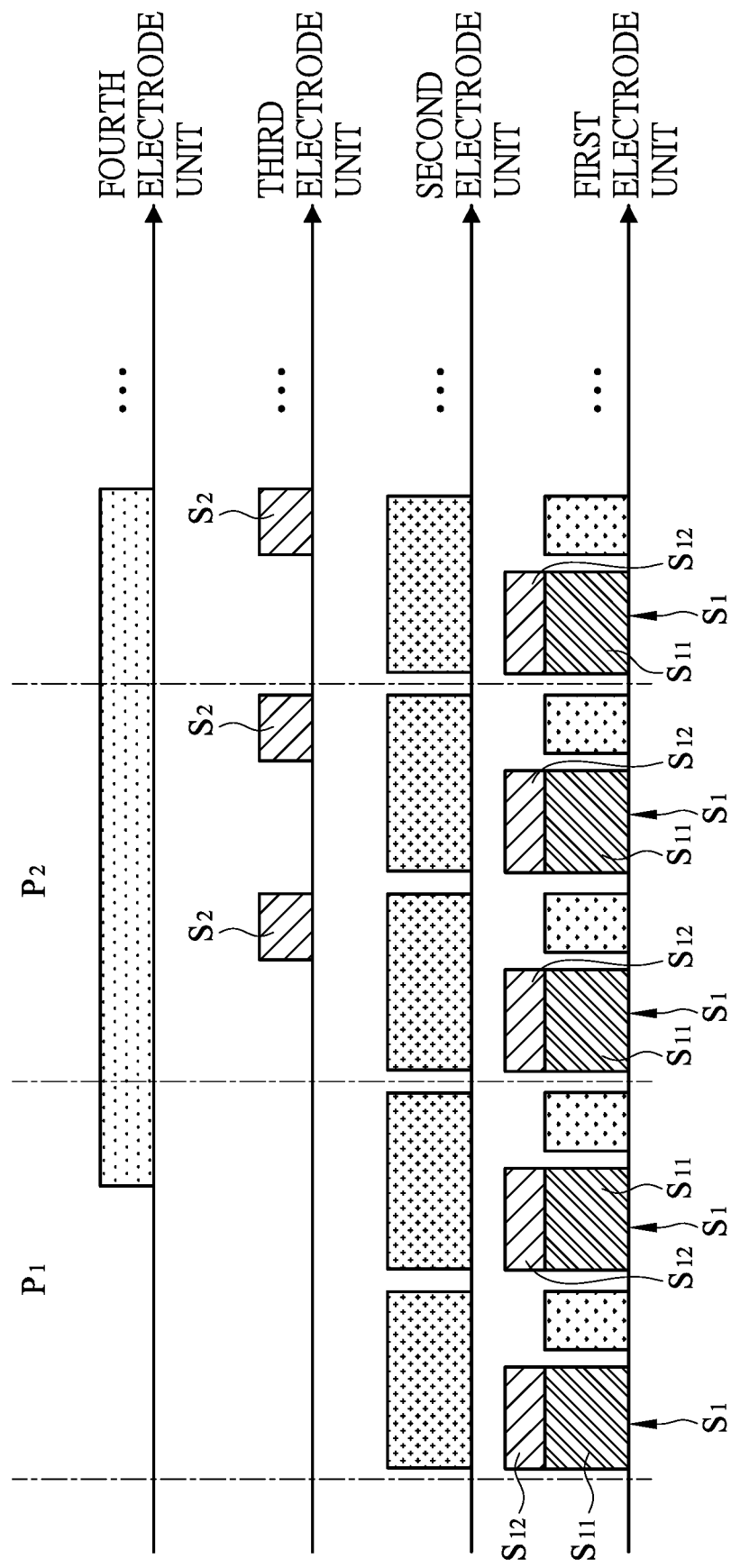
FIG. 5 is an illustrative operational view of a second embodiment of a signal transmission method in accordance with the present invention, showing frames for signal transmission.

With reference to FIGS. 5, 2A and 2B, the touch device 10 executes two times of the first mode and the second mode in sequence in a frame. After receiving the modulation signal of the touch device 10, the input device 20A starts to send the downlink signal when the touch device 10 switches to the second mode. In the first mode, the touch device 10 drives the first electrode units 12 with the modulation signal $S_1$, and the modulation signal $S_1$ serves as the driving signal $S_{11}$ and the uplink signal Sit simultaneously. The second electrode units 13 receive the sensing signal. The fourth electrode unit 212A of the input device 20A receives the modulation signal $S_1$. In the second mode, the first electrode units 12 and the second electrode units 13 of the touch device 10 are configured to receive the downlink signal $S_2$ sent by the third electrode unit 211A of the input device 20A. The fourth electrode unit 212A of the input device 20A can continuously receive the signal or switch to off. In this embodiment, the input device 20A does not approach or contact the touch operation area 11 of the touch device 10 during the first half of the frame $P_1$. When the end of the frame $P_1$ is reached, the input device 20A approaches or contacts the touch operation area 11 of the touch device 10. However, at this time, the fourth electrode unit 212A of the input device 20A fails to receive the modulation signal $S_1$ again in time. Therefore, until the beginning of the frame $P_2$, the fourth electrode unit 212A of the input device 20A completely receives the modulation signal $S_1$ that the first electrode units 12 transmit for the first time in the frame $P_2$. The third electrode unit 211A of the input device 20A then sends the downlink signal $S_2$ every time the touch device 10 enters the second mode until the input device 20A is away from the touch device 10 and the modulation signal $S_1$ is not received.

Figure 6:
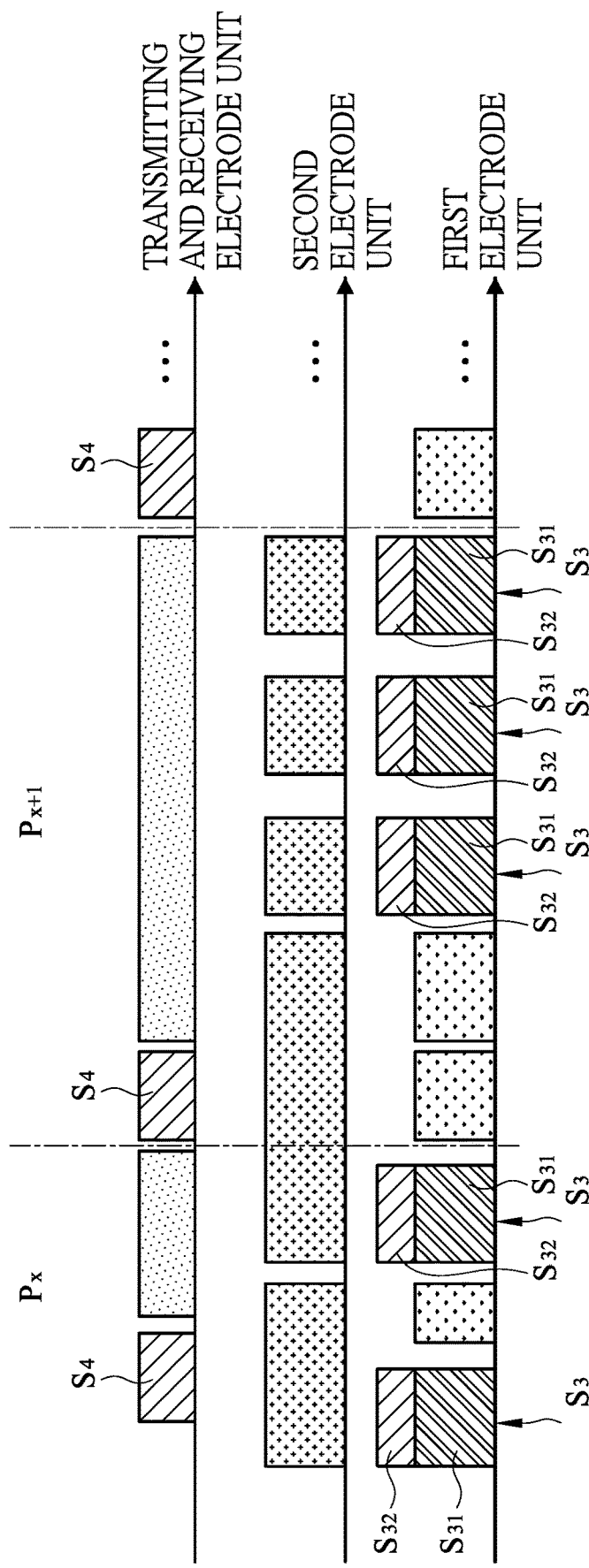
FIG. 6 is an illustrative operational view of a third embodiment of a signal transmission method in accordance with the present invention, showing frames for signal transmission.

With reference to FIGS. 6, 1A and 1B, the input device 20 transmits a beacon message at fixed time intervals even tough the input device 20 does not receive the modulation signal. In the first mode, the touch device 10 drives the first electrode units 12 with the modulation signal $S_3$, and the modulation signal $S_3$ serves as the driving signal $S_{31}$ and the uplink signal $S_{32}$ simultaneously. The second electrode units 13 receive the sensing signal, and the transmitting and receiving electrode unit 210 of the input device 20 receives the modulation signal $S_3$. In the second mode, the first electrode units 12 and the second electrode units 13 of the touch device 10 are configured to receive the beacon message $S_4$ from the transmitting and receiving electrode unit 210 of the input device 20. In this embodiment, when the input device 20 does not receive the modulation signal $S_3$, the transmitting and receiving electrode unit 210 of the input device 20 sends the beacon message $S_4$ at the beginning of each frame, and then receives the signal. When the transmitting and receiving electrode unit 210 of the input device 20 receives the modulation signal $S_3$ sent by the first electrode units 11 during the frame $P_x$, the input device 20 interrupts the original frame $P_x$ in advance in response to the execution time of the next second mode of the touch device 10. Then the input device 20 enters the next frame $P_{x+1}$. That is, the input device 20 interrupts the time that should originally receives signals and starts transmitting the beacon message $S_4$ corresponding to the start time of the second mode of the touch device 10. However, the input device 20 does not change the time of sending and receiving signals in other subsequent frames except the time of receiving the signal is shortened in the frame $P_x$. The input device 20 starts transmitting the beacon message $S_4$ earlier to synchronize the input device 20 with the touch device 10 in advance. Then the reaction speed between the input device 20 and the touch device 10 is effectively improved.

Figure 7:
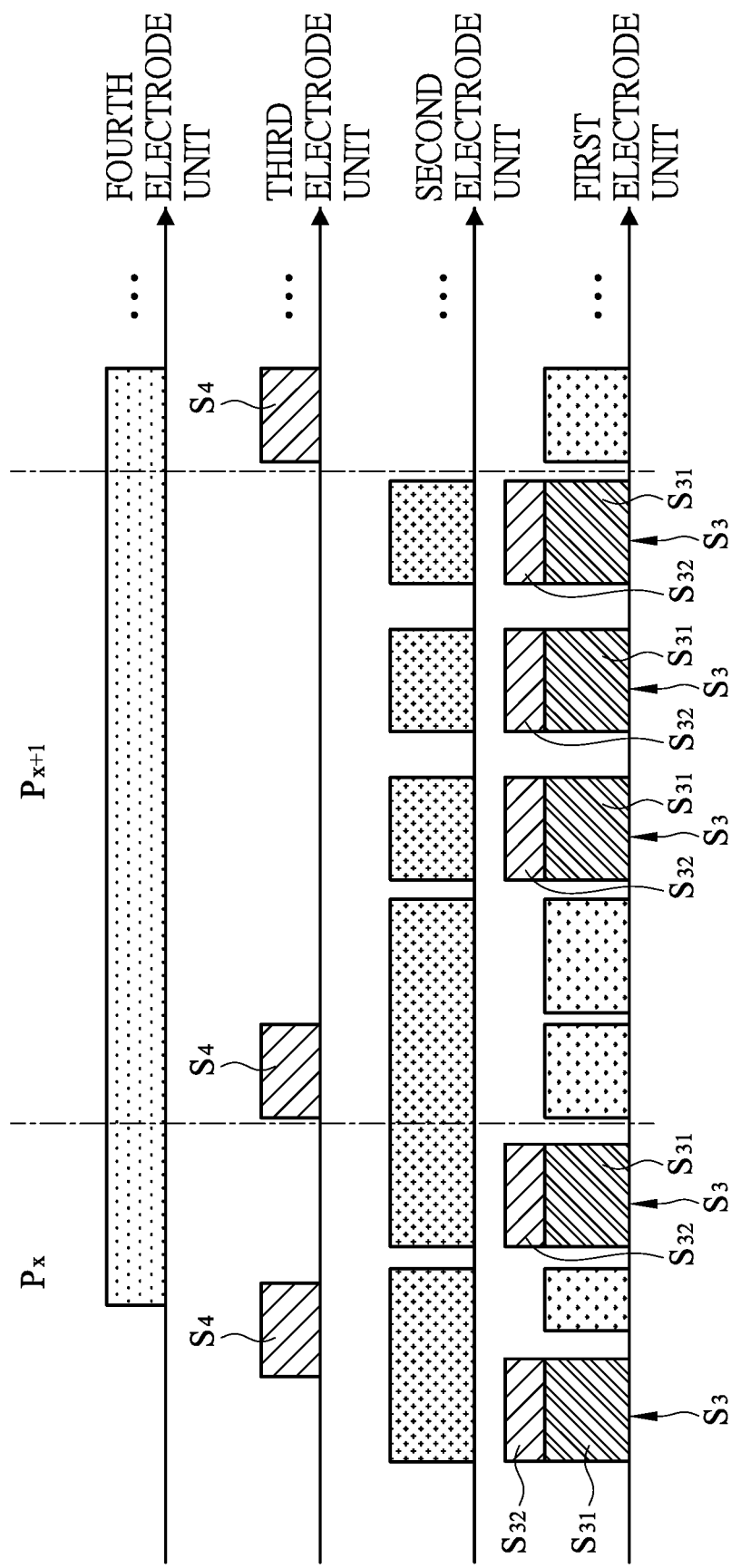
FIG. 7 is an illustrative operational view of a fourth embodiment of a signal transmission method in accordance with the present invention, showing frames for signal transmission.

With reference to FIGS. 7, 2A and 2B, the input device 20A transmits a beacon message at fixed time intervals even tough the input device 20A does not receive the modulation signal. In the first mode, the touch device 10 drives the first electrode units 12 with the modulation signal $S_3$, and the modulation signal $S_3$ serves as the driving signal $S_{31}$ and the uplink signal $S_{32}$ simultaneously. The second electrode units 13 receive the sensing signal, and the fourth electrode unit 212A of the input device 20A receives the modulation signal $S_3$. In the second mode, the first electrode units 12 and the second electrode units 13 of the touch device 10 are configured to receive the beacon message $S_4$ from the third electrode unit 211A of the input device 20A. The fourth electrode unit 212A of the input device 20A can continuously receive the signal or switch to off. In this embodiment, when the input device 20A does not receive the modulation signal $S_3$, the third electrode unit 211A of the input device 20A sends the beacon message $S_4$ at the beginning of each frame, and then the fourth electrode unit 212A of the input device 20A receives the signal. When the fourth electrode unit 212A of the input device 20A receives the modulation signal $S_3$ sent by the first electrode units 12 during the frame $P_x$, the input device 20A interrupts the original frame $P_x$ in advance in response to the execution time of the next second mode of the touch device 10. Then the input device 20A enters the next frame $P_{x+1}$. That is, the input device 20A interrupts the time that should originally receives signals and starts transmitting the beacon message $S_4$ corresponding to the start time of the second mode of the touch device 10.

However, the input device 20 does not change the time of other subsequent frames except shortening the time of the frame P. The input device 20A starts transmitting the beacon message $S_4$ earlier to synchronize the input device 20A with the touch device 10 in advance. Then the reaction speed between the input device 20A and the touch device 10 is effectively improved.

Figure 8:
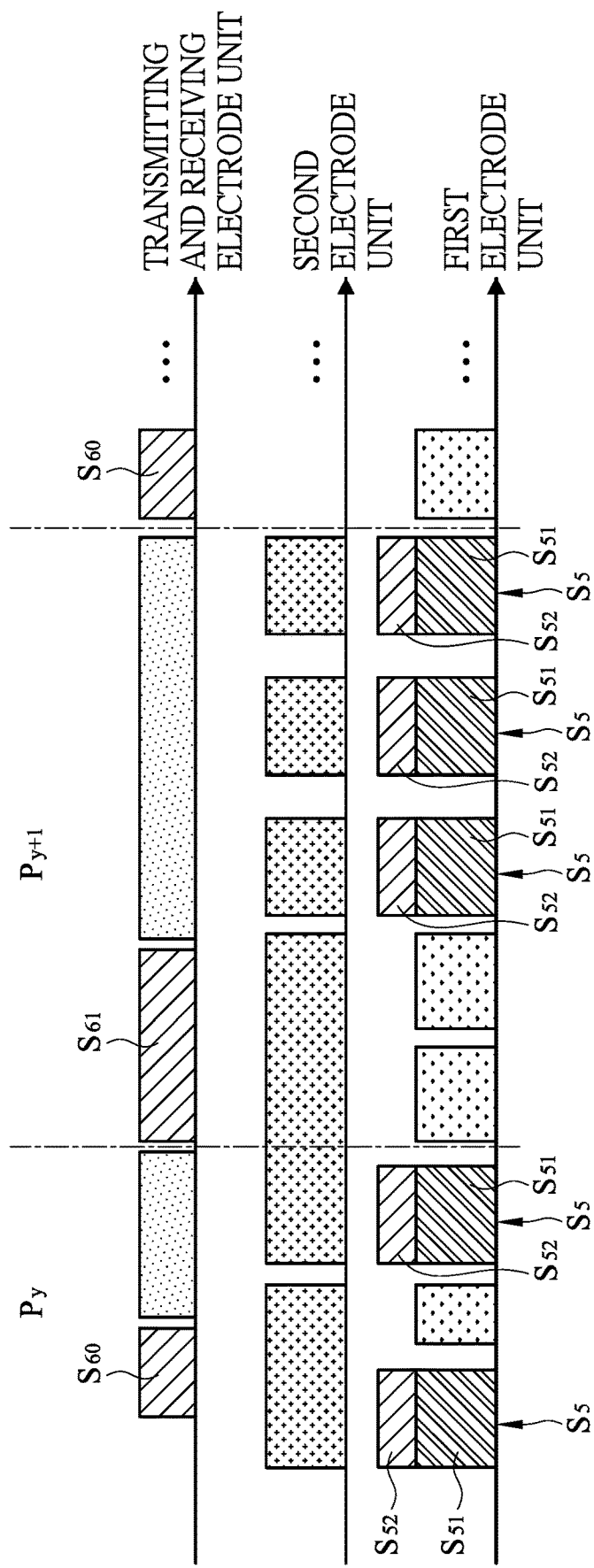
FIG. 8 is an illustrative operational view of a fifth embodiment of a signal transmission method in accordance with the present invention, showing frames for signal transmission.

With reference to FIGS. 8, 1A and 1B, the input device 20 transmits a beacon message at fixed time intervals and with a fixed length of time even tough the input device 20 does not receive the modulation signal. In the first mode, the touch device 10 drives the first electrode units 12 with the modulation signal $S_5$, and the modulation signal $S_5$ serves as the driving signal $S_{51}$ and the uplink signal $S_{52}$ simultaneously. The second electrode units 13 receive the sensing signal, and the transmitting and receiving electrode unit 210 of the input device 20 receives the modulation signal $S_5$. In the second mode, the first electrode units 12 and the second electrode units 13 of the touch device 10 are configured to receive the beacon message $S_{60}$, $S_{61}$ from the transmitting and receiving electrode unit 210 of the input device 20. In this embodiment, when the input device 20 does not receive the modulation signal $S_5$, the transmitting and receiving electrode unit 210 of the input device 20 sends the beacon message $S_{60}$ at the beginning of each frame, and then receives the signal. When the transmitting and receiving electrode unit 210 of the input device 20 receives the modulation signal $S_5$ sent by the first electrode units 12 during the frame $P_y$, the input device 20 interrupts the original frame $P_y$ in advance in response to the execution time of the next second mode of the touch device 10. Then the input device 20 enters the next frame $P_{y+1}$. That is, the input device 20 interrupts the time that should originally receives signals and starts transmitting the beacon message $S_{61}$ corresponding to the start time of the second mode of the touch device 10. The amount and or the time length of the beacon message $S_{61}$ is also increased in the frame $P_{y+1}$. However, the input device 20 does not change the time of sending and receiving signals in other subsequent frames except the time of receiving the signal is shortened in the frame $P_y$ and the amount and or the time length of the beacon message $S_{61}$ is increased in the frame $P_{y+1}$. The input device 20 starts transmitting the beacon message $S_{61}$ earlier and increases the amount or the time length of the beacon message $S_{61}$ to synchronize the input device 20 with the touch device 10 in advance and obtain enough synchronization information.

Figure 9:
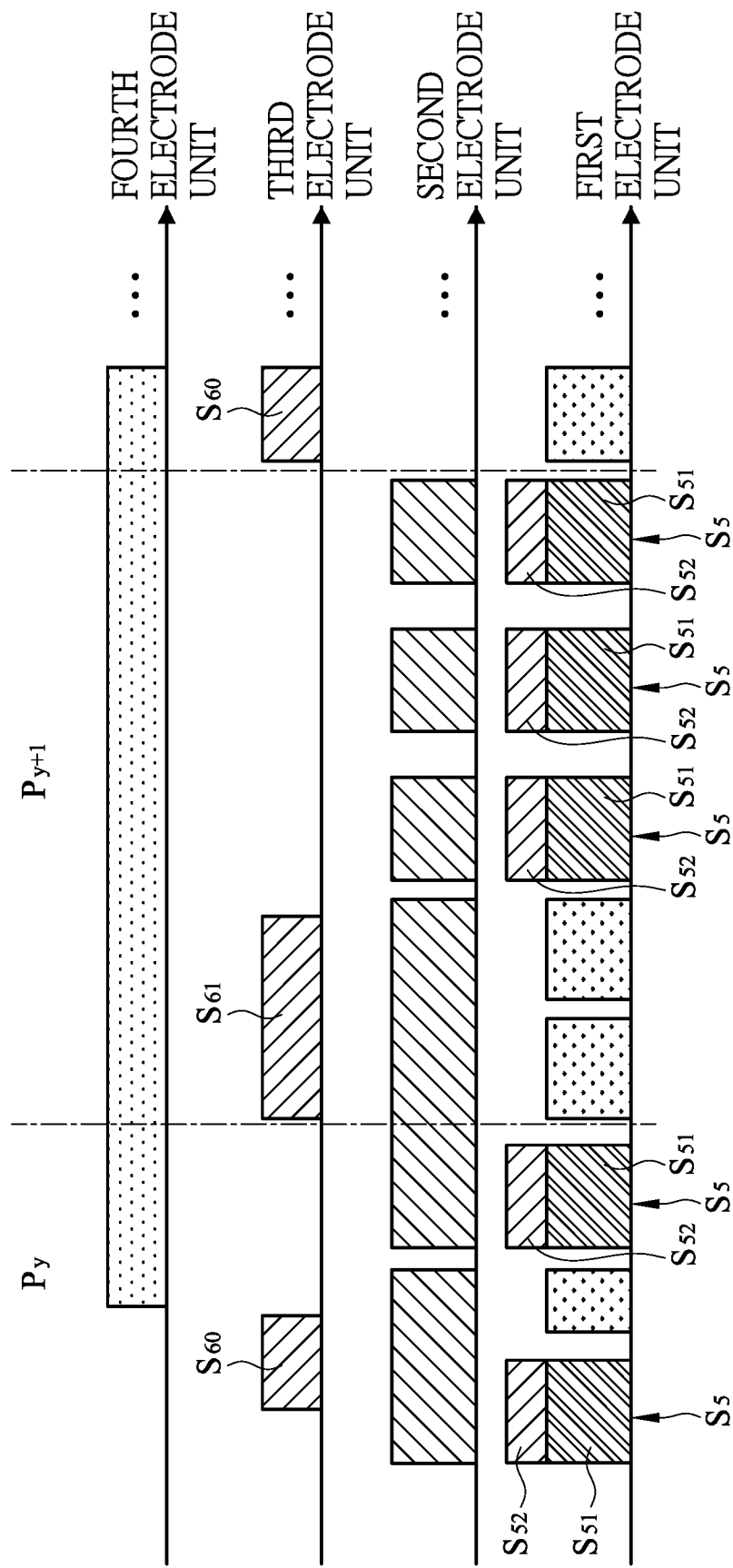
FIG. 9 is an illustrative operational view of a sixth embodiment of a signal transmission method in accordance with the present invention, showing frames for signal transmission.

With reference to FIGS. 9, 2A and 2B, the input device 20A transmits a beacon message at fixed time intervals and with a fixed length of time even though the input device 20A does not receive the modulation signal. In the first mode, the touch device 10 drives the first electrode units 12 with the modulation signal $S_5$, and the modulation signal $S_5$ serves as the driving signal $S_{51}$ and the uplink signal $S_{52}$ simultaneously. The second electrode units 13 receive the sensing signal, and the fourth electrode unit 212A of the input device 20A receives the modulation signal $S_5$. In the second mode, the first electrode units 12 and the second electrode units 13 of the touch device 10 are configured to receive the beacon message $S_{60}$ from the third electrode unit 211A of the input device 20A. The fourth electrode unit 212A of the input device 20A can continuously receive the signal or switch to off. In this embodiment, when the input device 20A does not receive the modulation signal $S_5$, the third electrode unit 211A of the input device 20A sends the beacon message $S_{60}$ at the beginning of each frame, and then the fourth electrode unit 212A of the input device 20A receives the signal. When the fourth electrode unit 212A of the input device 20A receives the modulation signal $S_5$ sent by the first electrode units 12 during the frame $P_y$, the input device 20A interrupts the original frame $P_y$ in advance in response to the execution time of the next second mode of the touch device 10. Then the input device 20A enters the next frame $P_{y+1}$. That is, the input device 20A interrupts the time that should originally receive signals, and starts transmitting the beacon message $S_{61}$ corresponding to the start time of the second mode of the touch device 10. However, the input device 20A does not change the time of sending and receiving signals in other subsequent frames except the time of receiving the signal is shortened in the frame $P_y$ and the amount and or the time length of the beacon message $S_{61}$ is increased in the frame $P_{y+1}$. The input device 20A starts transmitting the beacon message $S_{61}$ earlier and increases the amount and or the time length of the beacon message $S_{61}$ to synchronize the input device 20A with the touch device 10 in advance and obtain enough synchronization information.

Figure 10:
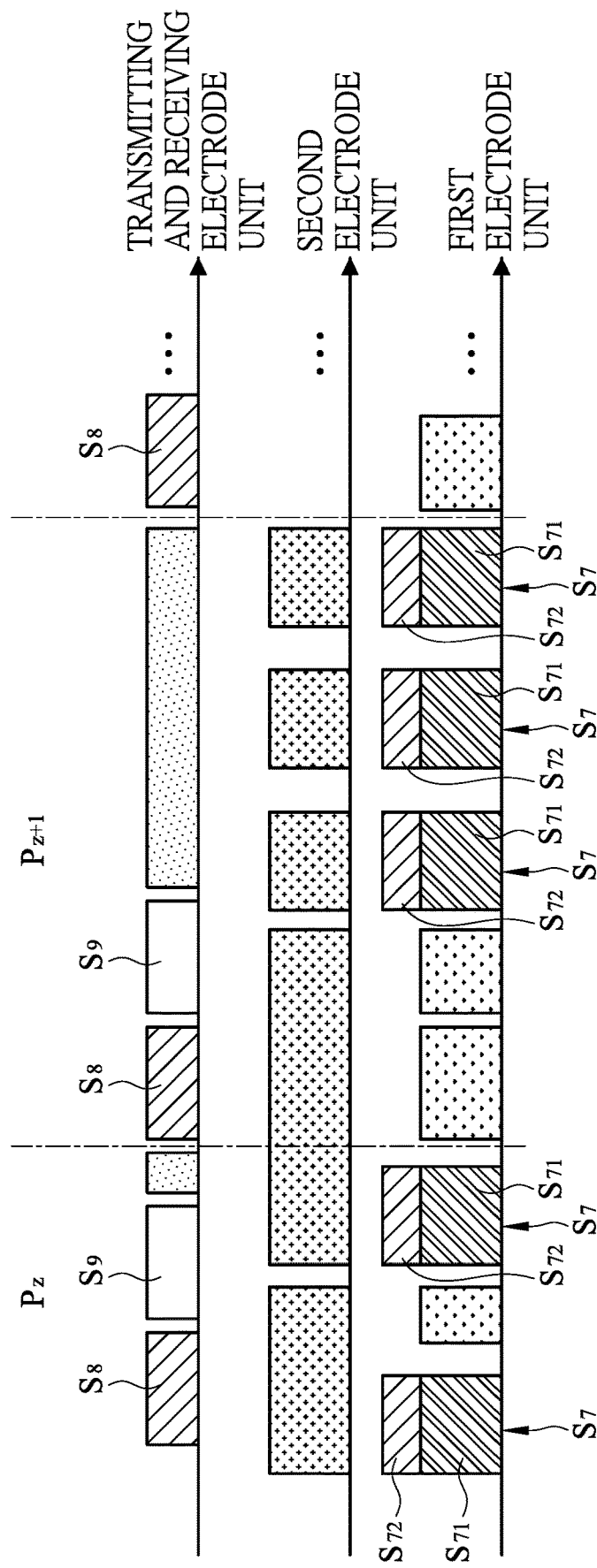
FIG. 10 is an illustrative operational view of a seventh embodiment of a signal transmission method in accordance with the present invention, showing frames for signal transmission.

With reference to FIGS. 10, 1A and 1B, the input device 20 transmits a beacon message and a side information (recording information such as pressure information, battery information and so on of the input device 20) at fixed time intervals even though the input device 20 does not receive the modulation signal. In the first mode, the touch device 10 drives the first electrode units 12 with the modulation signal $S_7$, and the modulation signal $S_7$ serves as the driving signal $S_{71}$ and the uplink signal $S_{72}$ simultaneously. The second electrode units 13 receive the sensing signal, and the transmitting and receiving electrode unit 210 of the input device 20 receives the modulation signal $S_7$. In the second mode, the first electrode units 12 and the second electrode units 13 of the touch device 10 are configured to receive the beacon message $S_8$ and the side information $S_9$ from the transmitting and receiving electrode unit 210 of the input device 20. In this embodiment, when the input device 20 does not receive the modulation signal $S_7$, the transmitting and receiving electrode unit 210 of the input device 20 sends the beacon message $S_8$ and the side information $S_9$ at the beginning of each frame, and then receives the signal. When the transmitting and receiving electrode unit 210 of the input device 20 receives the modulation signal $S_7$ sent by the first electrode units 12 during the frame $P_z$, the input device 20 interrupts the original frame $P_z$ in advance in response to the execution time of the next second mode of the touch device 10. Then the input device 20 enters the next frame $P_{z+1}$. That is, the input device 20 interrupts the time that should originally be used to receive signals, and starts transmitting the beacon message $S_8$ and the side information $S_9$ corresponding to the start time of the second mode of the touch device 10. However, the input device 20 does not change the time of sending and receiving signals in other subsequent frames except the time of receiving the signal is shortened in the frame $P_z$. The input device 20 starts transmitting the beacon message $S_8$ earlier to synchronize the input device 20 with the touch device 10 in advance. Then the reaction speed between the input device 20 and the touch device 10 is effectively improved.

Figure 11:
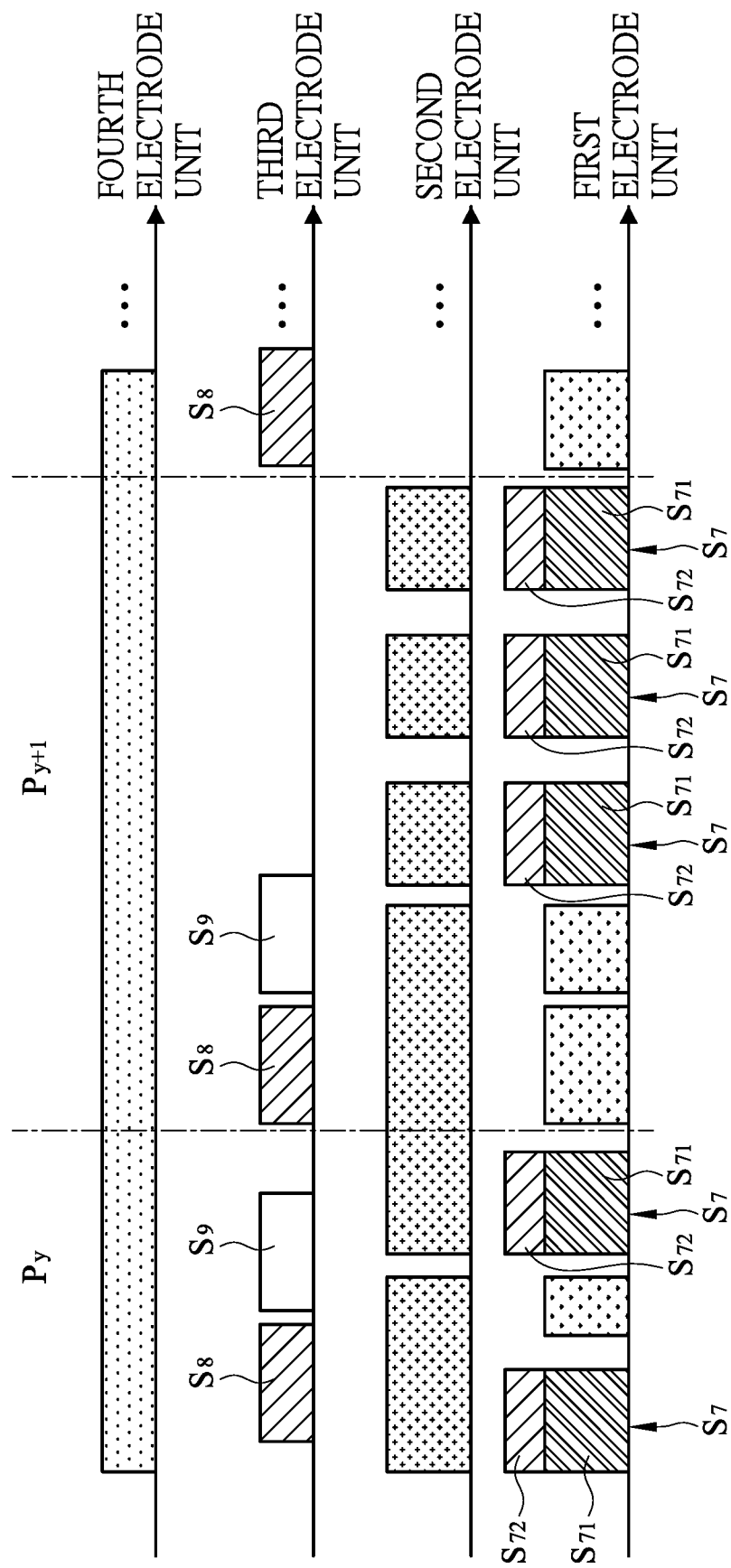
FIG. 11 is an illustrative operational view of a eighth embodiment of a signal transmission method in accordance with the present invention, showing frames for signal transmission.

With reference to FIGS. 11, 2A and 2B, the input device 20A transmits a beacon message and a side information (recording information such as pressure information, battery information and so on of the input device 20) at fixed time intervals even though the input device 20A does not receive the modulation signal. In the first mode, the touch device 10 drives the first electrode units 12 with the modulation signal $S_7$, and the modulation signal $S_7$ serves as the driving signal $S_{71}$ and the uplink signal $S_{72}$ simultaneously. The second electrode units 13 receive the sensing signal, and the fourth electrode unit 212A of the input device 20A receives the modulation signal $S_7$. In the second mode, the first electrode units 12 and the second electrode units 13 of the touch device 10 are configured to receive the beacon message $S_8$ and the side information $S_9$ from the third electrode unit 211A of the input device 20A. The fourth electrode unit 212A of the input device 20A can continuously receive the signal or switch to off. In this embodiment, when the input device 20A does not receive the modulation signal $S_7$, the third electrode unit 211A of the input device 20A sends the beacon message $S_8$ and the side information $S_9$ at the beginning of each frame, and then the fourth electrode unit 212A of the input device 20A receives the signal. When the fourth electrode unit 212A of the input device 20A receives the modulation signal $S_7$ sent by the first electrode units 12 during the frame $P_z$, the input device 20A interrupts the original frame $P_z$ in advance in response to the execution time of the next second mode of the touch device 10. Then the input device 20A enters the next frame $P_{z+1}$. That is, the input device 20A interrupts the time that should originally receives signals and starts transmitting the beacon message $S_8$ and the side information $S_9$ corresponding to the start time of the second mode of the touch device 10. However, the input device 20 does not change the time of other subsequent frames except shortening the time of the frame $P_z$. The input device 20A starts transmitting the beacon message $S_8$ and the side information $S_9$ earlier to synchronize the input device 20A with the touch device 10 in advance. Then the reaction speed between the input device 20A and the touch device 10 is effectively improved.

In addition, in one embodiment, the input device 20A enters the next frame $P_{z+1}$ as a synchronization frame when the fourth electrode unit 212A of the input device 20A receives the modulation signal $S_7$ sent by the first electrode units 12 during the frame P. A time period or a frequency of sending the beacon message by the input device 20A during the synchronization frame $P_{z+1}$ is greater than a time period or a frequency of sending the beacon message by the input device during the original frame $P_z$.

Further, in one embodiment, when the touch device 10 has not received the beacon message from the input device 20, the modulation signal transmitted by the touch device 10 in the first mode has a modulation characteristic A. When the touch device 10 has received the beacon message from the input device 20, the modulation signal transmitted by the touch device 10 in the first mode has a modulation characteristic B. The modulation characteristic A and the modulation characteristic B are different modulation characteristics. Thereby, the input device 20 that has been synchronized with the touch device 10 no longer receives the modulation signal with the modulation characteristic A and synchronizes again.

In another aspect, the noise interference may be occurred when the input device 20 is used on the touch device 10. For example, when the input device 20 is hand-held, the palm portion of the user accidentally touches other parts of the touch operation area 11, and the uplink signal sent by the parts is coupled to the input device 20 through the palm portion of the user. In view of the above, the touch device 10 transmits the original modulation signal via the first electrode unit 12 to the area of the touch operation area 11 adjacent to where the input device 20 hovers over or contacts when the touch device 10 detects the input device 20. In other areas, an auxiliary signal is sent instead, so as to effectively eliminate noise interference.

Figure 12:
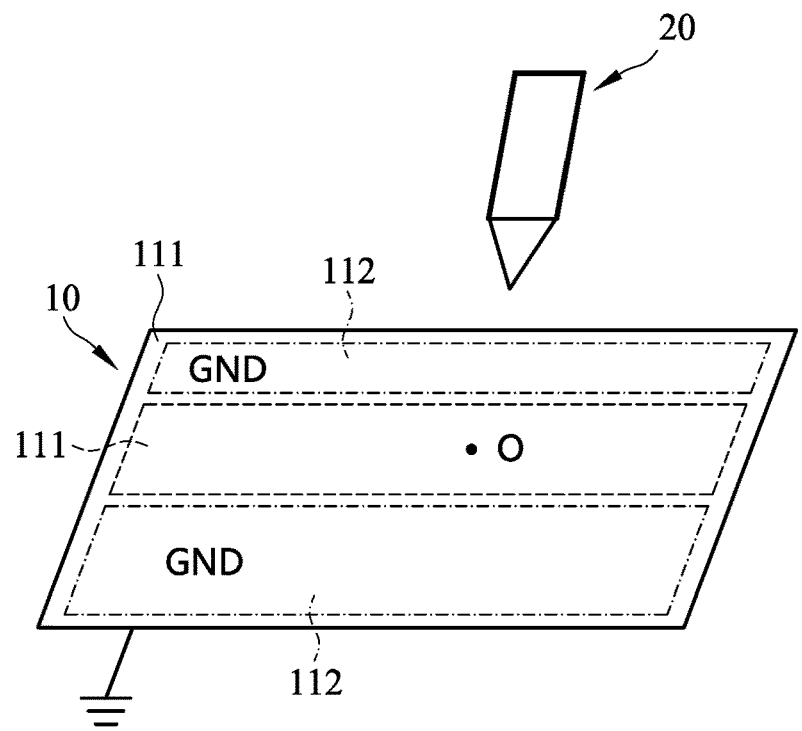
FIG. 12 is an illustrative operational view of a ninth embodiment of a signal transmission method in accordance with the present invention, showing different modulation signals transmitted.

With reference to FIGS. 12 and 1A, when the input device 20 hovers over or contacts the touch device 10, the touch device 10 determines the hovering or contact position O based on the downlink signal of the input device 20. Then the area adjacent to the position O on the touch operation area 11 is a first area 111, and the remaining area is a second area 112. In the first mode, the touch device 10 transmits the modulation signal through the first electrode units 12 in the first area 111, wherein all or part of the first electrode units 12 in the first area 111 transmits the modulation signal. The modulation signals may all have the same modulation characteristics or have different modulation characteristics but are orthogonal to each other. For the second area 112, the touch device 10 transmits the auxiliary signal through the first electrode units 12 of all or part of the second area 112. The auxiliary signal is a ground signal, wherein the ground signal refers to providing a fixed potential to the first electrode units 12 or grounding the first electrode units 12.

Figure 13:
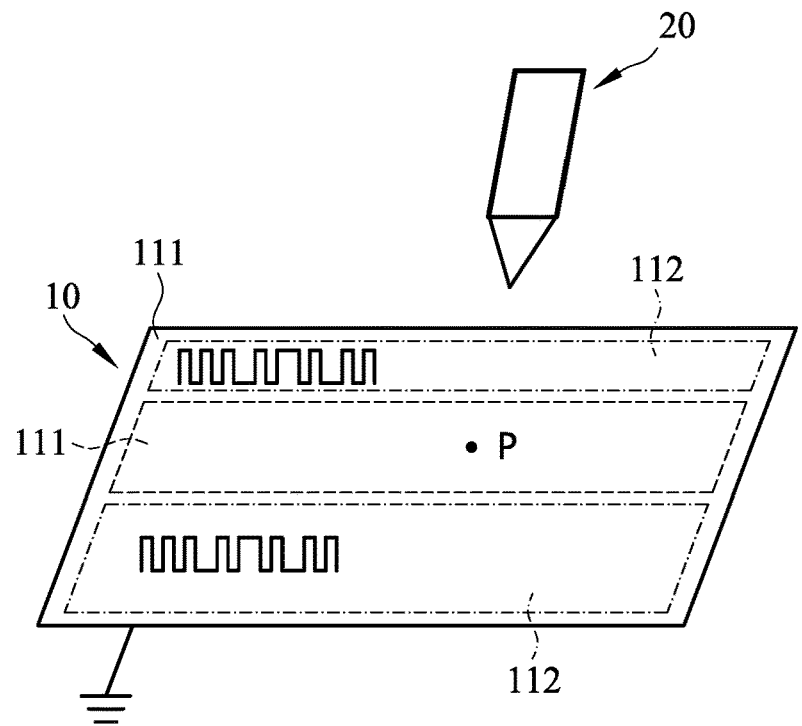
FIG. 13 is an illustrative operational view of a tenth embodiment of a signal transmission method in accordance with the present invention, showing different modulation signals transmitted.

With reference to FIGS. 13 and 1A, when the input device 20 hovers over or contacts the touch device 10, the touch device 10 determines the hovering or contact position P based on the downlink signal of the input device 20. Then the area adjacent to the position P on the touch operation area 11 is a first area 111, and the remaining area is a second area 112. In the first mode, the touch device 10 transmits the modulation signal with a first spreading code or a first coding way through the first electrode units 12 in the first area 111, wherein all or part of the first electrode units 12 in the first area 111 transmits the modulation signal. The modulation signals may all have the same modulation characteristics or have different modulation characteristics but are orthogonal to each other. For the second area 112, the touch device 10 transmits the auxiliary signal with a second spreading code or a second coding way through the first electrode units 12 of all or part of the second area 112.

Figure 14:
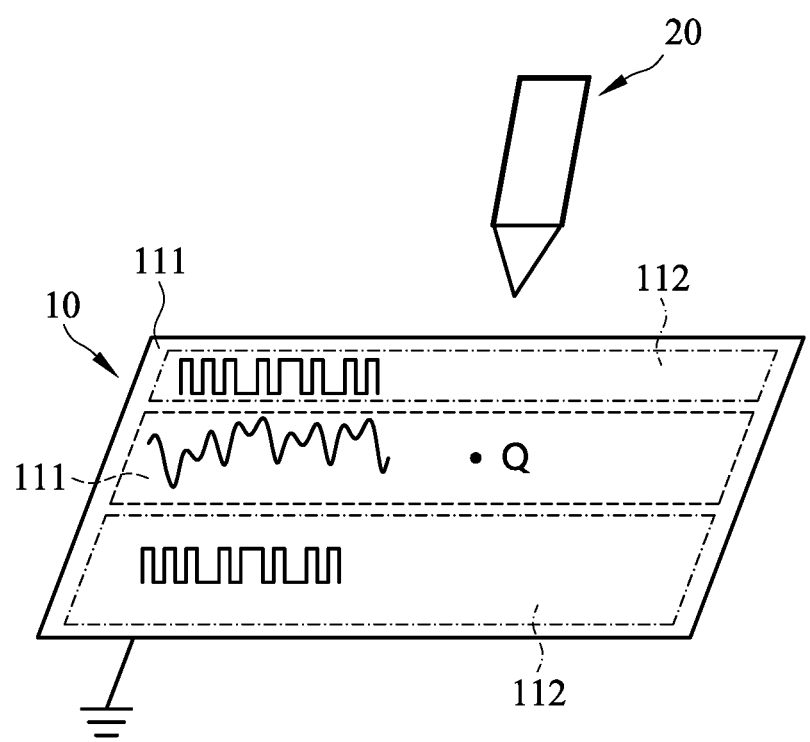
FIG. 14 is an illustrative operational view of a eleventh embodiment of a signal transmission method in accordance with the present invention, showing different modulation signals transmitted.

With reference to FIGS. 14 and 1A, when the input device 20 hovers over or contacts the touch device 10, the touch device 10 determines the hovering or contact position Q based on the downlink signal of the input device 20. Then the area adjacent to the position Q on the touch operation area 11 is a first area 111, and the remaining area is a second area 112. In the first mode, the touch device 10 transmits the modulation signal with a sine wave through the first electrode units 12 in the first area 111, wherein all or part of the first electrode units 12 in the first area 111 transmits the modulation signal. The modulation signals may all have the same modulation characteristics or have different modulation characteristics but are orthogonal to each other. For the second area 112, the touch device 10 transmits the auxiliary signal with a square wave through the first electrode units 12 of all or part of the second area 112. In another embodiment, before the touch device 10 receives the downlink signal from the input device 20, the touch device 10 transmits a mixed modulation signal having two different waveforms or different modulation characteristics through the first electrode unit 12, such as a mixed modulation signal with a sine wave and a square wave. After receiving the downlink signal, the touch device 10 transmits a modulation signal with one of the waveforms (such as a sine wave) or one of the modulation characteristics through the first electrode unit 12 in the first region 111, and transmits a modulation signal with another waveform (such as a square wave) or another modulation characteristic through the first electrode unit 12 in the second area 112.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A signal transmission method for a touch system, wherein the touch system comprises an input device and a touch device having a touch operation area, multiple first electrode units, multiple second electrode units and a control unit, and the method comprises steps of:
   executing a first mode and a second mode in a time division manner by the touch device:
   in the first mode, providing a modulation signal to at least one of the first electrode units for being used as a driving signal and an uplink signal transmitted to the input device, wherein the control unit of the touch device divides the touch operation area of the touch device into a first area and a second area according to a position of the input device when the touch device receives a downlink signal from the input device; the first area is an area where the input device hovers over or contacts the touch device; the second area is another area other than the first area, the first electrode units in the first area are driven by the modulation signal in subsequent first mode; the first electrode units in the second area are driven by an auxiliary signal in subsequent first mode; and the modulation signal is different to the auxiliary signal; and
   in the second mode, receiving a downlink signal from the input device through the first and second electrode units.

2. The signal transmission method for a touch system as claimed in claim 1, wherein the touch device provides the modulation signals to two of the first electrode units in the first mode; the modulation signal provided to one of the two of the first electrode units has a first modulation characteristic; the modulation signal provided to another one of the two of the first electrode units has a second modulation characteristic; and the first and second modulation characteristics are different but are orthogonal to each other.

3. The signal transmission method for a touch system as claimed in claim 2, wherein the two of the first electrode units are adjacent or spaced apart from each other by n rows of the first electrode units, and n is greater than or equal to 1.

4. The signal transmission method for a touch system as claimed in claim 1, wherein the auxiliary signal is a signal with a constant potential.

5. The signal transmission method for a touch system as claimed in claim 1, wherein the modulation signal and the auxiliary signal have different waveforms, different spreading codes, different coding ways or different phases.

6. The signal transmission method for a touch system as claimed in claim 1, wherein the input device transmits a beacon message at predetermined time intervals; the input device ends an original frame and then enters a synchronization frame when the input device receives the modulation signal sent by the touch device; and then the input device sends the beacon message during the synchronization frame.

7. The signal transmission method for a touch system as claimed in claim 6, wherein a time period or a frequency of sending the beacon message by the input device during the synchronization frame is greater than a time period or a frequency of sending the beacon message by the input device during the original frame.

8. The signal transmission method for a touch system as claimed in claim 6, wherein the modulation signal sent by the touch device in the first mode has a third modulation characteristic when the touch device does not receive the beacon message from the input device; the modulation signal sent by the touch device in the subsequent first mode has a fourth modulation characteristic when the touch device receive the beacon message from the input device; and the first and second modulation characteristics are different.

9. The signal transmission method for a touch system as claimed in claim 8, wherein the first and second modulation characteristics being different means that the first and second modulation characteristics have different spreading codes or are coded in different ways.

10. A touch system comprising:
    a touch device having
       a touch operation area;
       multiple first electrode units arranged under the touch operation area;
       multiple second electrode units arranged under the touch operation area along different direction to the first electrode units; and
       a control unit electrically connecting to the first and second electrode units; and
    an input device having;
       a controller; and
       an electrode assembly electrically connecting to the controller;
    wherein the touch device executes a first mode and a second mode in a time division manner;
    wherein in the first mode, providing a modulation signal to at least one of the first electrode units for being used as a driving signal and an uplink signal transmitted to the input device, wherein the control unit of the touch device divides the touch operation area of the touch device into a first area and a second area according to a position of the input device when the touch device receives a downlink signal from the input device; the first area is an area where the input device hovers over or contacts the touch device; the second area is another area other than the first area, the first electrode units in the first area are driven by the modulation signal in subsequent first mode; the first electrode units in the second area are driven by an auxiliary signal in subsequent first mode; and the modulation signal is different to the auxiliary signal; and
    wherein in the second mode, the first and second electrode units receive a downlink signal from the input device.

11. The touch system as claimed in claim 10, wherein the electrode assembly has a transmitting and receiving electrode unit and separately executes a sending operation of the downlink signal and a receiving operation of the modulation signal in a time division manner.

12. The touch system as claimed in claim 10, wherein the electrode assembly has a third electrode unit and a fourth electrode unit; the input device transmits the downlink signal through the third electrode unit, and receives the modulation signal through the fourth electrode unit.

13. The touch system as claimed in claim 10, wherein the touch device provides the modulation signals to two of the first electrode units in the first mode; the modulation signal provided to one of the two of the first electrode units has a first modulation characteristic; the modulation signal provided to another one of the two of the first electrode units has a second modulation characteristic; and the first and second modulation characteristics are different but are orthogonal to each other.

14. A signal transmission method for a touch device, wherein the touch device comprises a touch operation area, multiple first electrode units, multiple second electrode units and a control unit, and the method comprising a step of:

executing a first mode by providing a modulation signal to at least one of the first electrode units for being used as a driving signal and an uplink signal transmitted to an input device, wherein the control unit of the touch device divides the touch operation area of the touch device into a first area and a second area according to a position of the input device when the touch device receives a downlink signal from the input device; the first area is an area where the input device hovers over or contacts the touch device; the second area is another area other than the first area, the first electrode units in the first area are driven by the modulation signal in subsequent first mode; the first electrode units in the second area are driven by an auxiliary signal in subsequent first mode; and the modulation signal is different to the auxiliary signal.

15. The signal transmission method for a touch device as claimed in claim 14, wherein the touch device provides the modulation signals to two of the first electrode units in the first mode; the modulation signal provided to one of the of the first electrode units has a first modulation characteristic; the modulation signal provided to another one of the two of the first electrode units has a second modulation characteristic; and the first and second modulation characteristics are different but are orthogonal to each other.

16. The signal transmission method for a touch device as claimed in claim 15, wherein the two of the first electrode units are adjacent or spaced apart from each other by n rows of the first electrode units, and n is greater than or eaual to 1.

17. The signal transmission method for a touch device as claimed in claim 14, wherein the auxiliary signal is a signal with a constant potential.

18. The signal transmission method for a touch device as claimed in claim 14, wherein the modulation signal and the auxiliary signal have different waveforms, different spreading codes, different coding ways or different phases.

19. A touch device comprising:
a touch operation area;
multiple first electrode units arranged under the touch operation area;
multiple second electrode units arranged under the touch operation area along different direction to the first electrode units; and
a control unit electrically connecting to the first and second electrode units,
wherein the touch device executes a first mode by providing a modulation signal to at least one of the first electrode units for being used as a driving signal and an uplink signal transmitted to an input device, and
wherein the control unit of the touch device divides the touch operation area of the touch device into a first area and a second area according to a position of the input device when the touch device receives a downlink signal from the input device; the first area is an area where the input device hovers over or contacts the touch device; the second area is another area other than the first area, the first electrode units in the first area are driven by the modulation signal in subsequent first mode; the first electrode units in the second area are driven by an auxiliary signal in subsequent first mode; and the modulation signal is different to the auxiliary signal.

20. The touch device as claimed in claim 19, wherein the touch device provides the modulation signals to two of the first electrode units in the first mode; the modulation signal provide to one of the two of the first electrode units has a first modulation characteristic; the modulation signal provided to another one of the two of the first electrode units has a second modulation characteristic; and the first and second modulation characteristics are different but are orthogonal to each other.

* * * * *